United States Patent [19]

Traver

[11] Patent Number: 4,518,727

[45] Date of Patent: May 21, 1985

[54] WATER BASED RESIN EMULSIONS

[75] Inventor: Frank J. Traver, Troy, N.Y.

[73] Assignee: General Electric Company, Waterford, N.Y.

[21] Appl. No.: 604,607

[22] Filed: Apr. 30, 1984

Related U.S. Application Data

[63] Continuation-in-part of Ser. No. 229,247, Jan. 28, 1981, abandoned.

[51] Int. Cl.³ .............................. C08L 1/00; C08L 1/24
[52] U.S. Cl. .................................. 524/35; 106/287.13; 106/287.14; 524/42; 524/43; 524/858; 524/860
[58] Field of Search .................................... 524/35–46; 106/287.13, 287.14

[56] References Cited

U.S. PATENT DOCUMENTS

| 2,839,429 | 6/1958 | Marsh et al. | 260/29.2 M |
|---|---|---|---|
| 3,136,696 | 6/1964 | Harrison | 106/287.13 |
| 3,389,102 | 6/1968 | Schnurrbusch et al. | 260/18 |
| 4,028,339 | 6/1977 | Merrill | 427/230 |
| 4,043,924 | 8/1977 | Traver | 252/21 |
| 4,052,331 | 10/1977 | Dumoulin | 106/287.13 |
| 4,056,492 | 11/1977 | Merrill | 260/18 S |
| 4,218,250 | 8/1980 | Kasprzak | 260/13 |
| 4,383,062 | 5/1983 | Saad | 524/35 |

FOREIGN PATENT DOCUMENTS 2609157 9/1976 Fed. Rep. of Germany .
1539762 1/1979 United Kingdom .

OTHER PUBLICATIONS

Chemical Abstracts, 77:36,246p, 1972, Jones.
SR-141 Silicone Resins for Paints & Coatings.
SR-224 Silicone Electrical Varnishes & Adhesives.
Methocel, Dow Chemical Co.

*Primary Examiner*—Theodore Morris

[57] ABSTRACT

Water-based silicone resin emulsions are provided comprising an organopolysiloxane resin or mixture of resins which may include a solvent carrier, and a combination of emulsifying agents including cellulosic-type and anionic surfactant-type emulsifiers as well as an amount of water sufficient for providing a water-based emulsion having a desired viscosity and silicone resin solids content by weight.

18 Claims, No Drawings

WATER BASED RESIN EMULSIONS

This application is a continuation-in-part of application Ser. No. 229,247, filed 01-28-84 now abandoned.

BACKGROUND OF THE INVENTION

This invention relates to water-based emulsions of organopolysiloxane resins which are useful in coating applications where aqueous emulsions are preferable over traditional organic solvent based systems. The present invention provides both water-based silicone emulsions as well as methods for producing such compositions.

Silicone resins are often selected for applications requiring premium properties. These organopolysiloxane resins are known to offer outstanding endurance to environmental conditions such as weathering and extreme heat and cold. Silicone resins have found utility in a variety of applications such as pressure sensitive adhesives and release coatings. Furthermore, they have been found to be particularly useful in the paint industry which is continually seeking coating formulations which offer premium properties. Silicone resins solutions have previously been used in the paint coatings industry as vehicles and binders which are a necessary part of quality paint formulations.

Heretofore silicone resins were ordinarily supplied to formulators in solutions, that is to say, the resin consisted of so many parts by weight of silicone solids in some organic solvent such as xylene or toluene. However, recently the use of such organic solvents has been discouraged due to escalating costs for organic materials and increased concern for environmental considerations. Organic solvent based silicone resins often required the use of costly and cumbersome pollution abatement procedures and equipment. Thus there has been a trend in recent years for silicone resin systems which are water-based and therefore not dependent upon organic solvents.

However, such silicone resins which have been found to have particular utility in the art of paints and other coatings have often been immiscible or otherwise incompatible with aqueous coating systems. The present invention provides for the first time silicone resins which can be readily dispersed into water-based emulsion compositions thereby providing the beneficial properties of silicone resins without the cumbersome necessity of unduly large amounts of organic solvents.

As noted above, silicone resins are intended as high performance coating vehicles which can be used in high temperature-resistant coatings and will generally outperform conventional organic resins in similar applications. Those skilled in the art will recognize that there are a number of silicone resins which can be utilized in coating applications. Those silicone resins provided in U.S. Pat. Nos. 4,028,339 and 4,056,492 (both issued to Merrill) are examples of resins which can be made part of the water-based emulsion compositions of the present invention. Both of these patents are hereby incorporated by reference.

Previously known silicone resin emulsions have been successfully utilized in coating glass fabric, however, such compositions require the use of nonionic emulsifiers such as alkylphenoxy polyethoxyethanol. In such a system there is generally required approximately one part emulsifier for each nine parts of resin solids. When this type of emulsion technology is attempted in conjunction with the resin coating formulations discussed herein, as required by paint formulators, residual emulsifier is entrained in the coating and has a significant deleterious effect on such coatings at elevated temperatures.

The present invention, on the other hand, utilizes an emulsion system based upon a combination of anionic emulsifiers and certain methylcellulose ether compositions. The total emulsifier requirement for the emulsions of the present invention is generally in the range of approximately 0.5 to 2 percent based upon the weight of the silicone resin solids as compared to approximately 11% in the aforementioned emulsions. Furthermore, the reduction in organic emulsifier still enables the silicone resin film to function satisfactorily as a coating. Additionally, it seems that the use of methylcellulose agents enables the water-based compositions to coat out more uniformly as compared to the above-described emulsions utilizing nonionic emulsifiers.

It is therefore a primary object of the present invention to provide water-based emulsions of organopolysiloxane resins which are useful in coating formulations.

It is another object to provide an emulsifier system comprising a combination of anionic and methyl cellulose ether emulsifiers which are effective for dispersing silicone resins in a water-based coating system.

It is another object to provide a process for producing water-based silicone resin emulsions.

These and other objects will become apparent to those skilled in the art upon consideration of the accompanying description and claims.

SUMMARY OF THE INVENTION

The water-based silicone emulsions of the present invention are comprised of (a) 100 parts by weight of at least one organopolysiloxane resin composition consisting approximately of zero to 50 percent by weight of monofunctional units having the general formula $R_3SiO_{0.5}$, zero to 60 percent by weight difunctional units of the formula $R_2SiO$, zero to 100 percent by weight trifunctional units having the general formula $RSiO_{1.5}$, and zero to 60 percent by weight tetrafunctional units having the general formula $SiO_2$. As those skilled in the art recognize, there must be present at least ten mole percent of trifunctional units, tetrafunctional units, or mixture thereof in order to be a resinous siloxane material. Accordingly, the emulsions of the present invention must contain siloxanes having at least ten mole percent, and preferably at least fifteen mole percent, of such trifunctional and tetrafunctional units. In the above forumlae R represents a substituted or unsubstituted monovalent hydrocarbon radical which will ordinarily be selected from the group consisting of, independently, methyl and phenyl radicals. The organopolysiloxane resins utilized in the present invention will ordinarily have an R to Si ratio of, approximately, 1.0 to 1.99 R groups for each silicone atom. It is to be understood that the present invention contemplates the use of blends of different organopolysiloxane resins in the present emulsions as well as the use of a single type resin for each emulsion.

A more particular example of organopolysiloxane resins which are useful in the emulsions of the present inventions are those comprised of, approximately, 5 to 40 percent by weight $CH_3SiO_{1.5}$ units, zero to 35 percent $(CH_3)_2SiO$ units, 15 to 65% $(C_6H_5)SiO_{1.5}$ units, and zero to 50 percent $(C_6H_5)SiO$ units, wherein there is present, approximately, 1.0 to 1.8 organic radicals for each silicone atom.

It is to be noted that these organopolysiloxane resins can be emulsified in water through the process described in the present invention. However, it is common in the art of silicone resins that such resins be provided in solutions consisting of some specified weight percent silicone resin solids based upon the weight of said silicone solids and the solvent. For example, the silicone resin may be provided as a approximately 20 to 90 percent by weight silicone resin solution in an organic solvent such as toulene or xylene. It is to be noted that this organic solvent, if present, is not a critical component of the present invention nor does it ordinarily detract in any way from the useful properties of these water-based silicone emulsions. Indeed, often the presence of small amounts of organic solvents in such emulsions impart otherwise beneficial properties to such emulsions.

The water-based emulsions of the above described silicone resins are provided by utilizing a combination of emulsifying agents. The amount of emulsifying agents required to emulsify each 100 parts by weight resin solids will vary widely depending upon process conditions and the selection of the remaining constituent ingredients of the emulsion. Those skilled in the art will be able to produce a variety of water-based silicone resin emulsions according to the method set forth herein, and will be able to adjust the amount of emulsifying agents according to individual desires. Without intending to limit the scope of the present invention in any way, it will ordinarily be the case that, approximately, 0.25 to 4.0 parts by weight of the combination of emulsifying agents will be necessary to produce the water-based silicone resin emulsions of the present invention. It has been discovered by the present invention that a particular combination of emulsifying agents is effective for dispersing these silicone resins and thereby providing water-based emulsions. The combination of emulsifying agents is comprised of 5 to 95 percent by weight of a cellulosic emulsification agent in combination with 95 to 5 percent by weight of an anionic surfactant or emulsifying agent. For example, 70 to 75 percent by weight cellulosic emulsifier and 25 to 30 percent anionic surfactant are known to provide satisfactory emulsions in accordance with the present disclosure. Particular examples of each of these types of emulsifiers are given later in the specification. When an effective amount of such combinations of emulsifying agents are combined with the organopolysiloxane resins in the presence of water, a water-based silicone resin emulsion can be provided through the utilization of well known emulsification techniques such as colloid milling. The amount of water present is not critical and will ordinarily depend upon the application to which the emulsion will be put. The amount of water is merely dependent upon a desire to provide a preselected silicone resins solids content by weight in the resulting emulsion. As stated, although the amount of water is not critical there will ordinarily be approximately 25 to 500 parts by weight and more preferably 50 to 300 parts by weight of this water per 100 parts of the organopolysiloxane resin. If more than 100 parts by weight resin is present per 25 parts by weight water, emulsification will be difficult. If less than 100 parts by weight resin is present per 500 parts by weight water, there will be insufficient resin present in the emulsion to impart the desired properties to the end product.

The process of the present invention provides the above described water based silicone resin emulsion compositions by combining the specified constituent ingredients and then applying well known emulsification techniques.

DESCRIPTION OF THE INVENTION

Silicone resins which may be used in the compositions of the present invention may be prepared by a number of well known processes such as, for example, by hydrolyzing an organohalosilane blend wherein the composition of the resin can be varied by changing the proportions of the constituent organohalosilanes to be hydrolyzed. An exemplary resin might start with a blend of about 60 mole percent methyltrichlorosilane, about 35 mole percent of phenyltrichlorosilane and about 5 mole percent of dimethyldichlorosilane in the presence of water, acetone and a water-immiscible organic solvent. In general, this hydrolysis medium could contain from about 1.7 parts to 10 parts of water, 0.2 to 5 parts of acetone and 0.3 to 5 parts of said water-immiscible organic solvent per part by weight of the silane blend.

The various components of the hydrolysis mixture can be added concomitantly or separately in any desired order. Generally, the organohalosilanes are added to the mixture of water, acetone and organic solvent. Preferably, when this method is used a proportion of from 2 to 6 parts of water, about 0.3 to about 2 parts of acetone, and about 0.6 to about 2 parts of organic solvent, per part of the total weight of organohalosilane blend, is employed. It is preferred that the organohalosilanes are added to the hydrolysis medium, rather than vice versa, as this limits the concentration of hydrochloric acid which is formed during the hydrolysis reaction. A strong hydrochloric acid solution is undesirable in this example as the hydrochloric acid causes acid polymerization of the acetone forming polymerization products which add undesirable color to the product and have a deleterious effect on the physical properties of the product.

A preferred method to prepare organopolysiloxane resins which may be used in this invention is the dual feed process. The dual feed process comprises feeding the blend of organohalosilanes and from about 0.9 to 5 parts, preferable 0.9 to 1.2 parts of acetone from separate containers and through separate conduits, then premixing them immediately prior to hydrolysis. It is necessary to limit the contact time if small amounts of water are present in the acetone or in the atmosphere in contact with the organohalosilanes, as the water present causes hydrolysis of the organohalosilanes generating acid which causes the acetone to polymerize. The initial hydrolysis medium prior to the introduction of the silane blend-acetone mixture contains from about 0 to 4.1 parts of acetone and preferably from 0.9 to 1.2 parts of acetone. The amount of water and organic solvent can be as set forth hereinabove, with preferably from about 3 to 3.5 parts of water and 0.9 to 1.2 parts of organic solvent per part of the total weight of the blend of organohalosilanes.

The temperature of the hydrolysis mixture can be controlled by the rate of addition of the reagents, or by external heat or by cooling if desired. During hydrolysis, a temperature of between about 20° C. to about 40° C. is preferred. After the addition of all the reagents is completed, the mixture is generally agitated for an additional period of time such as 15 to 30 minutes or more to allow for complete hydrolysis of the organohalosilanes. The mixture is then allowed to settle and the acid aqueous (bottom) layer is drawn off from the organic layer. Depending upon individual desires, the organic layer can then be stripped of solvent to a solids concentration of up to 100%. The organic solvent may be stripped under reduced pressure or atmosphere pressure. At this point, the resin may be bodied, i.e., build-up of molecular weight, under total reflux, by condensing and cross-linking silanol units, with the aid of, for example, a catalyst such as iron octoate or Celite (diatomaceous earth) or mixtures thereof, to a desired viscosity, preferably 5-12 cps. at 25° C. at 20% by weight resins solids. Moreover, resin impurities may be removed by filtration, using, for example, filtering aids such as Celite 545 (diatomaceous earth, sold by Johns Manville), Fuller's earth (calcium montmorillonite), and mixtures of the same, or simply by centrifugation. The resulting silanol-containing organopolysiloxane resin has an organo radical to silicon ratio of about 1.05 to 1.

Included among the water-immiscible organic solvents used in the above-described process for providing silicone resins are, for example, hydrocarbons such as benzene, toluene, xylene and the like; esters such as butyl acetate, ethyl acetate, ethers such as diethylether and the like. Toluene is most preferred because it is a good solvent and has a low boiling point. In general, however, any water-immiscible organic solvent, which is inert to the hydrolysis reactants during hydrolysis and in which the hydrolyzate is soluble to provide for its separation for the aqueous layer, may be used.

Of course, through the process provided by the present invention it is now possible to disperse these heretofore water-immiscible resins in aqueous media.

One of the classes of emulsifying agents required for the water-based silicone resin emulsions of the present invention are methylcellulose ether products. Suitable methylcellulose ether products are available from Dow Chemical Company under its trademark METHOCEL. These cellulose ethers are derived from cellulose and contain repeating anhydroglucose units. Methylcellulose or cellulose methyl ether is derived from cellulose by conversion to alkali cellulose which is then reacted with methyl chloride. Hydroxypropyl methylcellulose or propylene glycol ether is similarly manufactured but utilizes propylene oxide in addition to the methyl chloride reactant.

Additionally, a nonionic water-soluble cellulose ether known as KLUCEL hydroxy propyl cellulose is manufactured by Hercules, Inc.

The other class of required emulsifying agents which are used in combination with the above-described cellulose ether products are the anionic emulsifiers such as sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

The water-based silicone resin emulsions of the present invention can be made by any of several methods. Ordinarily the order of addition of ingredients is not critical. One suitable method calls for the dispersion of the cellulose ether agent in water with agitation and heat until the solids are dissolved. The water phase of the emulsion products can also be added in two, three or more parts, as desired. Ordinarily, from 0.5 to 1.0 parts by weight cellulose ether and 0 to 1 parts by weight anionic emulsifier per 100 parts by weight silicone resin solids will be effective for emulsifying such resins in an aqueous system. Those skilled in the art will be able to vary the proportion of the constituent ingredients in order to provide desirable resin emulsion formulations.

Additionally, optional ingredients such as formalin can be added to these emulsions depending upon a given desired end use without seriously detracting from the properties of the water-based emulsion. Of course, materials such as talc or mica, which are utilized in green tire lubricants to provide channels for release of air, are not included within the scope of optional additives for practicing the present invention. Furthermore, those skilled in the art will appreciate that other compounds such as n-alkyl monoethers of polyethylene glycols desirably are not included in the emulsions of the present invention as they deleteriously affect high temperature stability. An example of a typical silicone resin which can be used in the emulsions and processes of the present invention is SR-141 which is available from the General Electric Company.

The composition to be emulsified will then be blended until uniform whereupon emulsification can be induced by colloid milling of the composition or by homozenization or blending of the composition.

A colloid mill found useful for producing laboratory quantities of these water-based resin emulsions is Manton-Gaulin Colloid Mill, Model 2A. Such a mill has a 40 mil gap which is adjustable from 1 to 40 mils and can be operated at atmospheric pressure or under a feed pressure of 5 to 40 psig $N_2$. Of course, it is contemplated that those skilled in the art will be able to scale up the process of the present invention in order to produce commercial quantities of these water-based silicone emulsions.

The viscosity of any resulting emulsion can be controlled by varying the amount of water included in the blend. This can best be accomplished by first forming a premix comprised of the cellulose ethers and silicone resins along with part of the water. This premix can be emulsified by combining it with the anionic emulsifier and the remaining water. The accompanying examples demonstrate that the water may also be added in three increments.

The organopolysiloxane resins which are utilized in the following examples are comprised primarily of tri-functional units of the formulae $CH_3SiO_{1.5}$ (T units) and $(C_6H_5)SiO_{1.5}$ (T' units); and di-functional units of the formulae $(CH_3)_2SiO$ (D units), and $(C_6H_5)_2SiO$ (D' units).

In the description of each resin, the term silane (P.B.W.) refers to parts by weight of the requisite organolalosilane precursor of the resin's functional units. Approximate weight percent silane and mole percent silane values are given for the convenience of those skilled in the art. The weight percent siloxane value is indicative of the approximate number of each type of siloxane units present in an average resin molecule. The R to Si Ratio is an expression used by those skilled in the art to indicate the approximate relative number of organo radicals associated with each silicon atom and is a useful measure of the degree of tri- and di-functionality in such silicone resins.

| UNITS | P.B.W. SILANE | WT. % SILANE | MOL % SILANE | WT. % SILOXANE |
|---|---|---|---|---|
| Silicone Resin - A | | | | |
| T | 149.5 | 10.6 | 13 | 7.34 |
| D | 129 | 25.8 | 37 | 22.86 |
| T' | 211.5 | 26.5 | 23 | 24.96 |
| D' | 253 | 37.1 | 27 | 44.84 |
| R to Si Ratio: 1.64 to 1. | | | | |
| SILICONE RESIN - B | | | | |
| T | 149.5 | 24.2 | 30 | 17.7 |
| D | 129 | 14.0 | 20 | 13.1 |
| T' | 211.5 | 34.4 | 30 | 34.23 |
| D' | 253 | 27.4 | 20 | 34.97 |
| R to Si Ratio: 1.40 to 1. | | | | |
| SILICONE RESIN - C | | | | |
| T | 149.5 | 17.1 | 20 | 12.36 |
| D | 129 | 29.6 | 40 | 27.31 |
| T' | 211.5 | 24.3 | 20 | 23.80 |
| D' | 253 | 29.0 | 20 | 26.53 |
| R to Si Ratio: 1.6 to 1. | | | | |
| SILICONE RESIN - D | | | | |
| T | 149.5 | 52.6 | 50 | 35.17 |
| D | 129 | 3.8 | 5 | 3.88 |
| T' | 211.5 | 43.6 | 45 | 60.95 |
| D' | 253 | 0 | 0 | 0 |
| R to Si Ratio: 1.05 to 1. | | | | |
| SILICONE RESIN - E | | | | |
| T | 149.5 | 8 1 | 10 | 5.51 |
| D | 129 | 27.9 | 40 | 24.36 |
| T' | 211.5 | 22.9 | 20 | 21.24 |
| D' | 253 | 41.1 | 30 | 48.89 |
| R to Si Ratio: 1.7 to 1. | | | | |

DESCRIPTION OF THE PREFERRED EMBODIMENT

In order to more fully and clearly describe the present invention, it is intended that the following examples be considered as illustrative rather than limiting the invention disclosed and claimed herein. All parts are by weight.

EXAMPLE 1

Twenty grams of Methocel A-25 by weight cellulose powder were charged to 500 grams of water. Methocel A-25 is methylcellulose available from Dow Chemical Company, and exhibits a characteristic viscosity of approximately 25 centipoise at 20° C. when in a 2% aqueous solution. The methylcellulose was dispersed with agitation and heated to 75° C. to dissolve the solids. During heating, approximately 150 grams of water were lost. Sixty grams of additional water were added to the dispersion thereby providing an approximately 4.9% methylcellulose solution.

The silicone resin to be emulsified was designated as Silicone Resin-A and was a 60% by weight resin solution in toluene. The resin itself was the bodied resin hydrolysis product comprised of, approximately, 10.6% methyltrichlorosilane, 25.8% dimethyldichlorosilane, 26.5% phenyltrichlorosilane, and 37.1% diphenyldiclorosilane by weight. The 60% solution of Silicone Resin-A had an approximate viscosity of 200 centipoise at 20° C.

Silicone Resin-A has been described in the aforementioned table.

After the methylcellulose solution had been prepared it was combined with Silicone Resin-A, water, sodium lauryl sulfate and formalin to yield the following blend.

| Material | Amount by Weight |
|---|---|
| Silicone Resin-A | 60% |
| Water | 39.39% |
| Methocel A-25 | 0.27% |
| Sodium Lauryl Sulfate | 0.16% |
| Formalin | 0.18% formulation |

In the above described formulation, Methocel A-25 is given in percent methylcellulose powder contained in the blend without regard to the water of solution. The mixture was blended until uniform and then colloid milled. The colloid mill had a 10 mil gap at atmospheric pressure. The milling process resulted in a silicone emulsion having the following properties:

| % Silicone Solids | 37% |
|---|---|
| Viscosity (Brookfield RVF at 25° C.) | 1410 Centipoise |

EXAMPLE 2

A 1.25% methylcellulose solution was prepared by adding 25 grams of Methocel A4M (a methylcellulose powder having a 2% aqueous solution viscosity of 4000 centipoise at 20° C.) to 2000 grams of water. The methylcellulose powder and water were blended at elevated temperature until the powder was completely dispersed. Additional water was added to replace water lost through heating so that the 1.25% methylcellulose solution was obtained.

Silicone Resin-B is a 50% silicone resin solids composition in toluene and is primarily comprised of the hydrolysis products of 30% methyltrichlorosilane, 30% phenyltrichlorosilane, 20% dimethyldichlorosilane and 20% diphenyldichlorosilane, as given by mole ratios. Silicone Resin-B has been described in the aforementioned Table.

To 1420 grams of the 1.25% methylcellulose solution was added 4200 grams of Silicone Resin-B. The resin-methylcellulose mixture was blended until a uniform composition was obtained. In a separate container a blend of 1250 grams water, 11 grams sodium lauryl sulfate and 19 grams formalin was obtained. This second blended mixture was then added to the Resin-B/methylcellulose blend and agitated well. Next the combined blend was colloid milled, again the colloid mill had a 10 mil gap at atmospheric pressure. The resulting emulsion was paste-like and was diluted with 600 grams additional water to yield a final product having the properties:

| % Silicone Solids | 28.6% |
|---|---|
| Viscosity | 2200 Centipoise |

EXAMPLE 3

Since the emulsions prepared in Examples 1 and 2 had viscosities greater than 1000 centipoise, emulsions having lower viscosities which were therefore suitable for other purposes were prepared in the following manner.

A cellulosic solution was prepared for this example by combining 40 grams Methocel A-25 (methylcellulose powder described above) and 40 grams Methocel E-50 (which is a hydroxypropyl methylcellulose powder, having a nominal 2% aqueous solution viscosity of 50 centipoise at 20° C.), dispersed in 2000 grams water to yield a 4% cellulosic solution.

To 4818 grams of Silicone Resin-A which was utilized in Example 1, there was added 1106 grams of the 4% cellulosic solution; this mixture was blended until uniform. Meanwhile, a second solution was prepared from 2064 grams water, 13 grams sodium lauryl sulfate and 14 grams formalin. This second solution was blended at room temperature until uniform whereupon 800 grams of this solution was added to the emulsion premix containing Silicon Resin-A. This final mixture was blended until uniform and then colloid milled at atmospheric pressure with a 10 mil colloid mill gap. The resulting emulsified resin paste was dispersed in the remaining second solution. After blending, the resulting silicone resin emulsion had the properties:

| % Silicone Solids | 36.7% |
| --- | --- |
| Viscosity | 380 Centipoise |

Additionally, after two months shelf-aging, very little separation was noted and only mild agitation was necessary to redisperse the emulsion.

EXAMPLE 4

A cellulosic solution was prepared by combining 7.2 grams Methocel A-25 and 7.2 grams Methocel F-50 in 180 grams water. The solids were dispersed with agitation at 80° to 90° C. and then rapidly cooled to room temperature by charging 180 grams of ice water to the blend. Once the cellulose solution was uniform, it was added to 2160 grams of Silicone Resin-C solution. Silicone Resin-C is 80% silicone solids in toluene, and is the resin hydrolysis product of, approximately, 20% methyltrichlorosilane, 40% dimethyldichlorosilane, 20% phenyltrichlorosilane, and 20% diphenyldichlorosilane as given by mole ratios. Silicone Resin-C has been described in the aforementioned table. This cellulose-resin premix was blended for half an hour. Meanwhile an aqueous solution was prepared by combining 5.2 grams sodium lauryl sulfate, 6.2 grams formalin and 1055 grams water. This aqueous solution was then added to the cellulose-resin mixture and blended for an additional 45 minutes. When the mixture was uniform it was emulsified by passing through a colloid mill having an 8 mil gap at atmospheric pressure. The resulting silicone resin emulsion was found to have the following properties:

| % Silicone Solids | 49.0% |
| --- | --- |
| Viscosity | 2500 Centipoise |
| pH | 6.5 |

EXAMPLE 5

As in Example 4, 7.2 grams of each of Methocel A-25 and Methocel F-50 were dispersed in 180 grams water with agitation; the mixture was again cooled rapidly to room temperature by charging 180 grams ice water to the blend. This uniform cellulosic solution was added to 2170 grams of Silicone Resin-D, and this premix was blended for a half hour. Silicone Resin-D is a highly trifunctional, hard resin which is a useful vehicle for pigmented coatings and is a 60% silicone solids in toluene solution. Resin-D is the resin hydrolysis product of, approximately, 50 parts methyltrichlorosilane, 45 parts phenyltrichlorosilane and 5 parts dimethyldichlorosilane as given by mole ratios. Silicone Resin-D has been described in the aforementioned table. Simultaneously, as aqueous solution containing 1055 grams water, 5.4 grams sodium lauryl sulfate, and 6.2 grams formalin. This aqueous solution was then mixed with the resin premix and the combination was blended for approximately 30 minutes. The uniform mixture was then emulsified with a colloid mill having an 8 mil gap at atmospheric pressure. The resulting emulsion was found to contain 30.0% silicone solids, 6.1 pH and a viscosity of 385 centipoise at 20° C.

EXAMPLE 6

A cellulosic preblend was provided by mixing 4 parts each of Methocel F-50 and Methocel A-15 with 100 grams of water which was then heated to approximately 80° C. till the methylcellulose and hydroxyoropylcellulose powders were dispersed whereupon 100 grams of ice water was charged to cool the mixture. To this cellulosic solution was added 1200 grams of Silicone Resin-E which is an 80% resin solids in VM&P naptha solution which is useful as a silicone resin vehicle for heat resistant coating formulations. Silicone Resin-E is the resin hydrolysis product of, approximately, 8 parts methyltrichlorosilane, 23 parts phenyltrichlorosilane, 28 parts dimethyldichlorosilane, and 41 parts diphenyldichlorosilane by weight. Silicone Resin-E has been described in the aforementioned table.

Next, an aqueous solution was prepared by combining 3 grams sodium lauryl sulfate and 3.4 grams formalin with 585 grams water. This aqueous solution was added to the cellulose-resin premix and blended for approximately 30 minutes. The uniform mixture was then emulsified on a colloid mill having an 8 mil gap at atmospheric pressure. The resulting emulsion was found to have 49.0% solids content, 6.5 pH, and a viscosity of 2500 centipoise at 20° C.

Thus it is evident that a wide variety of silicone resins can be emulsified by the process of the present invention so that they are compatible with the environmentally attractive water-based systems discussed above.

EXAMPLE 7

Another water-based silicone resin emulsion can be prepared in the following manner: 7.2 parts Methocel A25 and 7.2 parts Methocel F50 are slowly charged to a vessel containing 180 parts water which has been preheated to 80° to 90° C. Methocel is a trademark of Dow Chemical Company. Methocel A25 is a methylcellulose powder which exhibits a characteristic viscosity of approximately 25 centipoise at 20° C. when in a 2% aqueous solution. Methocel F50 is a hydroxypropyl methylcellulose powder which exhibits a characteristic viscosity of approximately 50 centipoise at 20° C. in a 2% aqueous solution. The cellulosic powders are dispersed in the preheated water with agitation and the blend is cooled rapidly to 20° while adding an additional 180 parts water. To this dispersion is added the silicone resin which is to be emulsified. The silicone resin may be the bodied resin hydrolysis product of, approximately, 30M% methyltrichlorosilane, 30M% phenyltrichlorosilane, 20M% dimethyldichlorosilane and 20M% diphenyldichlorosilane as given in molar ratios. This bodied resin is cut with toluene to achieve a 60% silicone resin solids content. 2160 parts of this resin is added to the cellulosic dispersion prepared above along with 1055 parts additional water, 5.4 parts sodium lauryl sulfate and 6.2 parts formalin. The entire mixture is stirred until uniform whereupon it is colloid milled at atmospheric pressure with an 8 mil gap to form the emulsion. Stirring is continued until room temperature is reached. The water-based silicone resin emuilsion produced by the above procedure had an approximate silicone solids content of 30.7% and a viscosity of approximately 650 centipoise at 20° C.

What is claimed as new and desired to be secured by Letters Patent of the United States is:

1. A water based silicone resin emulsion consisting essentially of:
   (a) 100 parts by weight of at least one organopolysiloxane resin composition consisting essentially of zero to 50 percent by weight monofunctional units of the formula $R_3SiO_{0.5}$, zero to 60 percent by weight difunctional units of the formula $R_2SiO$, zero to 100 percent by weight of trifunctional units of the formula $RSiO_{1.5}$, and zero to 60 percent by weight tetrafunctional units of the formula $SiO_2$, wherein at least ten mole percent of the units are trifunctional units, tetrafunctional units or a mixture thereof, wherein R is a substituted or unsubstituted monovalent hydrocarbon radical and wherein said organopolysiloxane resin has an R to Si ratio of, approximately, 1.0 to 1.99 R groups for each silicon atom;
   (b) 0.25 to 4.0 parts by weight of a combination of emulsifying agents per 100 parts of said organopolysiloxane resin wherein said emulsifying agent combination consists essentially of 5 to 95 percent by weight of a cellulosic emulsification agent and 5 to 95 percent by weight of an anionic surfactant, and wherein said combination of emulsifying agents is effective for dispersing said organopolysiloxane resin in a water based emulsion; and
   (c) 25 to 500 parts by weight water.

2. An emulsion as in claim 1 wherein said water is present in an amount of, approximately 50 to 300 parts by weight per 100 parts by weight of said organopolysiloxane resin.

3. An emulsion as in claim 1 further comprising up to 500 parts by weight per 100 parts organopolysiloxane resin of an organic solvent.

4. An emulsion as in claim 3 wherein said organic solvent is selected from toluene, xylene, and benzene.

5. An emulsion as in claim 1 wherein said monovalent hydrocarbon radicals are selected from, independently, the group consisting of methyl and phenyl radicals.

6. An emulsion as in claim 1 wherein said organopolysiloxane resin is comprised of, approximately, 5 to 40 percent by weight $CH_3SiO_{1.5}$ units, zero to 35 percent $(CH_3)_2SiO$ units, 15 to 65 percent $(C_6H_5)SiO_{1.5}$ units, and zero to 50 percent $(C_6H_5)_2SiO$ units, wherein there is present, approximately 1.0 to 1.8 organic radicals for each silicon atom.

7. An emulsion as in claim 1 wherein said cellulosic emulsification agent is selected from methylcellulose and hydroxypropyl methylcellulose and combinations thereof.

8. An emulsion as in claim 1 wherein said anionic surfactant is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

9. A process for providing a water-based silicone resin emulsion comprising the steps of:
   I. providing a mixture consisting essentially of (a), (b) and (c) by combining:
      (a) 100 parts by weight of at least one organopolysiloxane resin composition consisting essentially of zero to 50 percent by weight monofunctional units of the formula $R_3SiO_{0.5}$, zero to 60 percent by weight difunctional units of the formula $R_2SiO$, zero to 100 percent by weight of trifunctional units of the formula $RSiO_{1.5}$, and zero to 60 percent by weight tetrafunctional units of the formula $SiO_2$, wherein at least ten mole percent of the units are trifunctional units, tetrafunctional units or a mixture thereof, wherein R is a substituted or unsubstituted monovalent hydrocarbon radical and wherein said organopolysiloxane resin has an R to Si ratio of, approximately, 1.0 to 1.99 R groups for each silicon atom;
      (b) 0.25 to 4.0 parts by weight of a combination of emulsifying agents per 100 parts of said organopolysiloxane resin wherein said emulsifying agent combination consists essentially of 5 to 95 percent by weight of a cellulosic emulsification agent and 95 to 5 percent by weight of an anionic surfactant, and wherein said combination of emulsifying agents is effective for dispersing said organopolysiloxane resin in a water based emulsion; and
      (c) 25 to 500 parts by weight water; and
   II. emulsifying said mixture consisting essentially of (a), (b), and (c).

10. A process as in claim 9 wherein said emulsifying step is accomplished by colloid milling.

11. A process as in claim 9 further comprising the step of preblending said combination of emulsifying agents or a portion thereof with a portion of said water prior to combining said emulsifying agents with said organopolysiloxane resin and a remaining portion of water.

12. A process as in claim 9 wherein said water is present in an amount of, approximately, 50 to 300 parts by weight per 100 parts by weight of said organopolysiloxane resin.

13. A process as in claim 9 further comprising the step of adding up to 500 parts by weight per 100 parts organopolysiloxane resin of an organic solvent.

14. A process as in claim 13 wherein said organic solvent is selected from toluene, xylene and benzene.

15. A process as in claim 9 wherein said monovalent hydrocarbon radicals are selected from, independently, the group consisting of methyl and phenyl radicals.

16. A process as in claim 9 wherein said organopolysiloxane resin is comprised of, approximately, 5 to 40 percent by weight $CH_3SiO_{1.5}$ units, zero to 35 percent $(CH_3)_2SiO$ units, 15 to 65 percent $(C_6H_5)SiO_{1.5}$ units, and zero to 50 percent $(C_6H_5)_2SiO$ units, wherein there is present, approximately 1.0 to 1.8 organic radicals for each silicon atom.

17. A process as in claim 9 wherein said cellulosic emulsification agent is selected from methylcellulose and hydroxypropyl methylcellulose and combinations thereof.

18. An emulsion as in claim 9 wherein said anionic surfactant is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

* * * * *